(12) United States Patent
Sgrignuoli et al.

(10) Patent No.: US 11,160,303 B2
(45) Date of Patent: Nov. 2, 2021

(54) DEVICE FOR CHANGING OPERATIVE PARTS FOR TOBACCO INDUSTRY MACHINES

(71) Applicant: G.D S.P.A., Bologna (IT)

(72) Inventors: Vittorio Sgrignuoli, Bologna (IT); Massimo Sartoni, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 480 days.

(21) Appl. No.: 16/301,387

(22) PCT Filed: May 22, 2017

(86) PCT No.: PCT/IB2017/053001
§ 371 (c)(1),
(2) Date: Nov. 13, 2018

(87) PCT Pub. No.: WO2017/203415
PCT Pub. Date: Nov. 30, 2017

(65) Prior Publication Data
US 2020/0205464 A1    Jul. 2, 2020

(30) Foreign Application Priority Data

May 26, 2016    (IT) .................. 102016000054220

(51) Int. Cl.
*A24C 5/02*    (2006.01)
*A24C 5/18*    (2006.01)
(Continued)

(52) U.S. Cl.
CPC .............. *A24C 5/02* (2013.01); *A24C 5/1828* (2013.01); *F16B 1/0057* (2013.01); *F16B 21/16* (2013.01)

(58) Field of Classification Search
CPC .................. A24C 5/02; A24C 5/1828
See application file for complete search history.

(56) References Cited

U.S. PATENT DOCUMENTS

| | | | |
|---|---|---|---|
| 4,944,629 A | 7/1990 | Peveto | |
| 6,379,072 B1* | 4/2002 | Brown | ............... B29C 45/1775 403/31 |
| 2016/0272134 A1* | 9/2016 | Mackowiak | ........ B60R 16/0207 |

FOREIGN PATENT DOCUMENTS

| | | |
|---|---|---|
| CN | 1679420 A | 10/2005 |
| CN | 101015393 A | 8/2007 |

(Continued)

OTHER PUBLICATIONS

Machine translation of EP2641485A2 (Year: 2021).*

(Continued)

*Primary Examiner* — Eric Yaary
*Assistant Examiner* — Jennifer A Kessie
(74) *Attorney, Agent, or Firm* — Shuttleworth & Ingersoll, PLC; Timothy Klima

(57) ABSTRACT

A device for changing operative portions for tobacco industry machines including a receiving portion made in a structural part of a tobacco industry machine; a plug member attached to an operative portion of the tobacco industry machine, a locking member, housed in the structural part of the machine and configured to adopt a locked position, where it locks the plug member in the receiving portion, and a released position, where it releases the plug member from the receiving portion and actuating means acting on the locking member at least to move the locking member from the locked position to the released position.

14 Claims, 12 Drawing Sheets

(51) Int. Cl.
  *F16B 1/00*    (2006.01)
  *F16B 21/16*   (2006.01)

(56) References Cited

FOREIGN PATENT DOCUMENTS

| | | | |
|---|---|---|---|
| CN | 101171978 A | 5/2008 | |
| CN | 101904560 A | 12/2010 | |
| CN | 103315389 A | 9/2013 | |
| CN | 104621713 A | 5/2015 | |
| EP | 2258220 A1 | 12/2010 | |
| EP | 2641485 A2 * | 9/2013 | ........... A24C 5/1807 |
| EP | 2641485 A2 | 9/2013 | |
| EP | 2878832 A1 | 6/2015 | |
| JP | H3-69313 | 4/1995 | |
| WO | WO2012092937 A1 | 7/2012 | |

OTHER PUBLICATIONS

Chinese Office Action dated Nov. 23, 2020 from counterpart Chinese Patent Application No. 201780029262.2.
Japanese Office Action dated Mar. 24, 2021 from counterpart Japanese Patent Application No. 2018-561726.
International Search Report dated Jul. 28, 2017 counterpart PCT App No. PCT/IB2017/053001.

* cited by examiner

FIG.12
A)
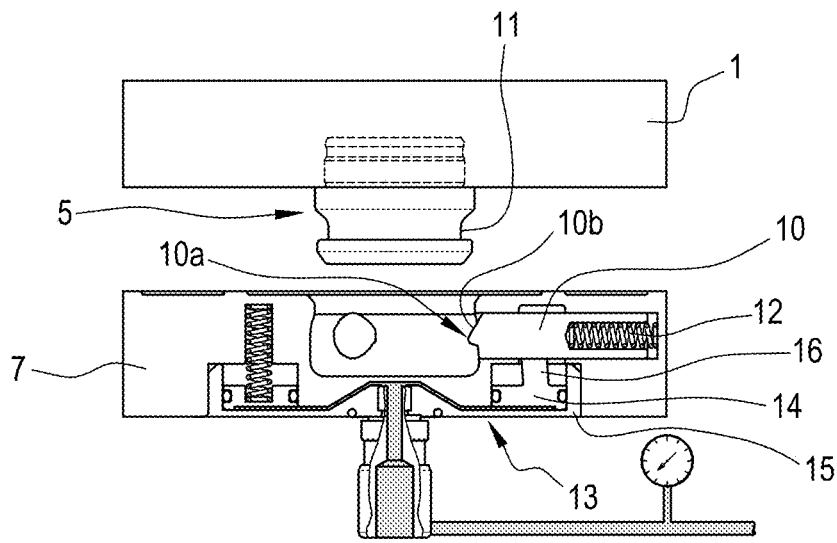
B)
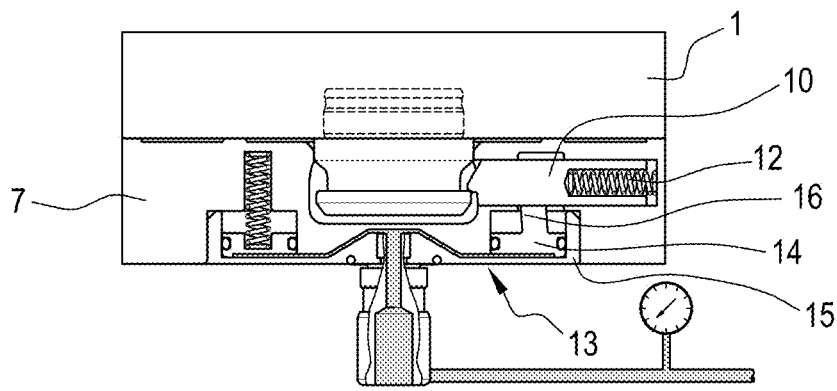
C)
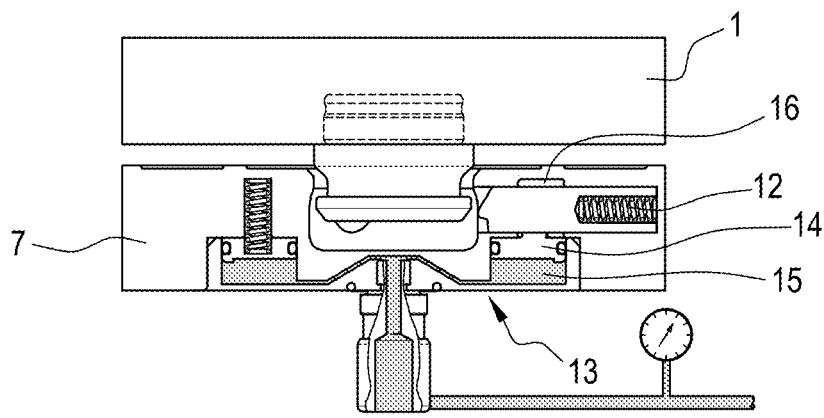

DEVICE FOR CHANGING OPERATIVE PARTS FOR TOBACCO INDUSTRY MACHINES

This application is the National Phase of International Application PCT/IB2017/053001 filed May 22, 2017 which designated the U.S.

This application claims priority to Italian Patent Application No. 102016000054220 filed May 26, 2016, which application is incorporated by reference herein.

TECHNICAL FIELD

This invention relates to a device for changing operative portions for tobacco industry machines, in particular machines for making cigarettes or parts thereof (machines for making the cigarette rod, machines for making filter rods, etc.).

BACKGROUND ART

It is known that tobacco industry machines are made in such a way as to allow for changeover, for example as a function of the diameter of the cigarette to be made, and for this purpose, traditional machines are provided with interchangeable parts allowing them to be adapted to the current product.

By way of an example, FIG. 1 shows a machine for simultaneously forming two continuous filter rods of traditional type. The machine has a guide plate 100 provided with two longitudinal, concave grooves 110, 120 in which respective streams of tow are stabilized and wrapped in corresponding strips of paper (as a result of the plate 100 being coupled to the respective upper counterplate 200).

The guide plate 100 can be replaced with a corresponding guide plate having a concave groove of different size and thus suitable for making cigarettes of different diameter. Replacement of the guide plate is done by hand by operating on screws or other fastening elements 130 accessible from the front of the machine using screwdrivers, spanners or other tools suitable for the purpose.

Similar solutions are available even when working units (for example, cutting devices) need to be replaced with others of a different nature or even when it becomes necessary to replace a device which has reached a limit level of wear and must be replaced with an identical, new device (for example, when replacing the cutter blades of a device for cutting a continuous rod or segments of filter or cigarette). These solutions generally involve the use of threaded parts in different parts of the machine.

These systems have the disadvantage of being highly time-consuming and, because operations usually involve numerous parts of the machine, the resulting overall machine downtime is unacceptable, especially in view of all the effort that goes into increasing the productivity of modern machines to extremely high levels.

DISCLOSURE OF THE INVENTION

In this context, the basic technical purpose of this invention is to provide a device for changing operative portions for tobacco industry machines to overcome the above mentioned disadvantages of the prior art.

More specifically, the aim of this invention is to provide a device for changing operative portions for tobacco industry machines and capable of operating very rapidly.

The technical purpose and aims specified are substantially achieved by a device for changing operative portions for tobacco industry machines, comprising the technical features described in one or more of the appended claims.

BRIEF DESCRIPTION OF THE DRAWINGS

The invention is described below with reference to the accompanying drawings, which illustrate a non-limiting embodiment of it and in which:

FIGS. 12A-12C illustrate a detail of the fastening system implemented in the device for changing operative portions according to this invention and in a temporal sequence of operating steps.

DETAILED DESCRIPTION OF PREFERRED EMBODIMENTS OF THE INVENTION

Figure 1:
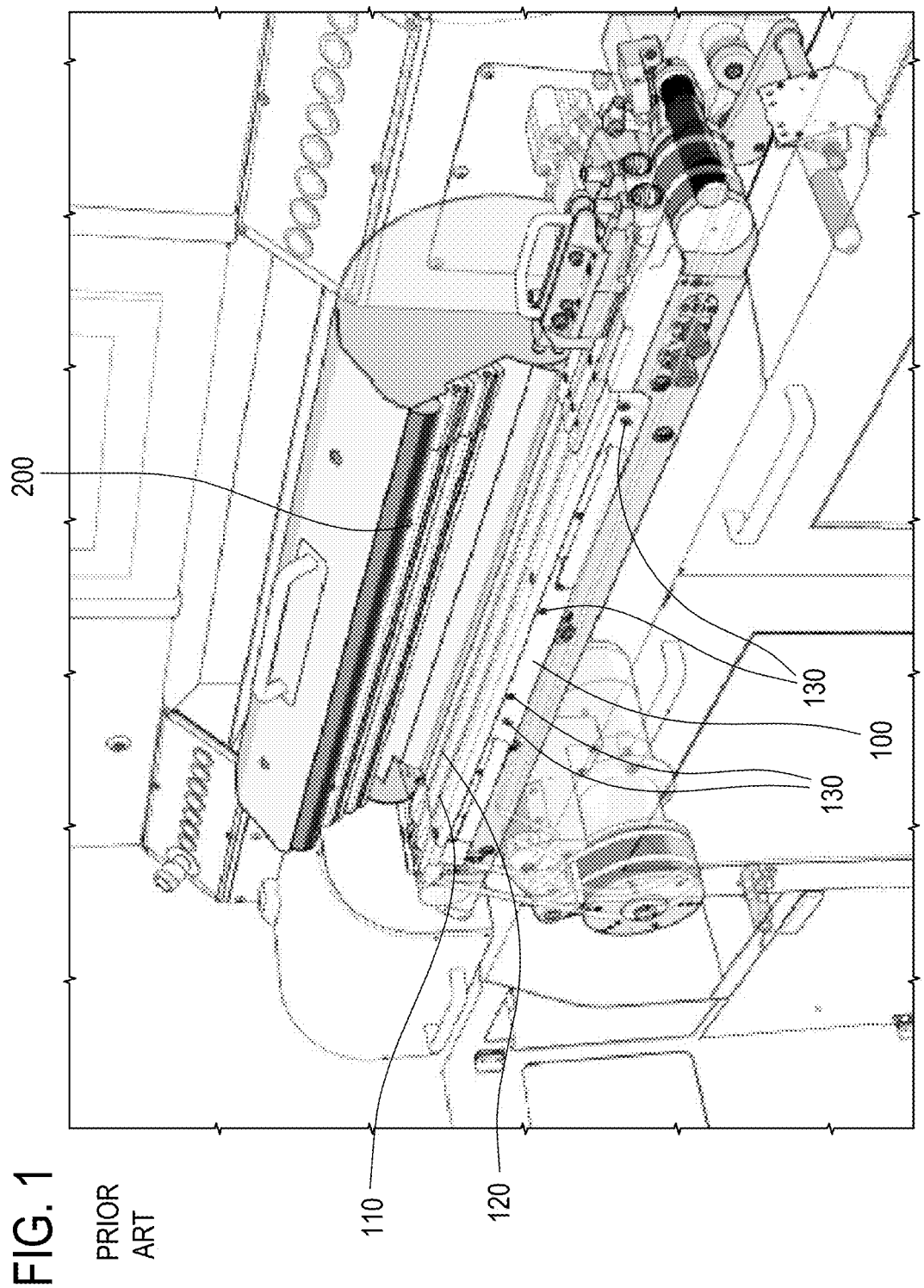
FIG. 1 shows a part of a tobacco industry machine, in particular designed to make two continuous filter rods, and having known features.
Figure 2:
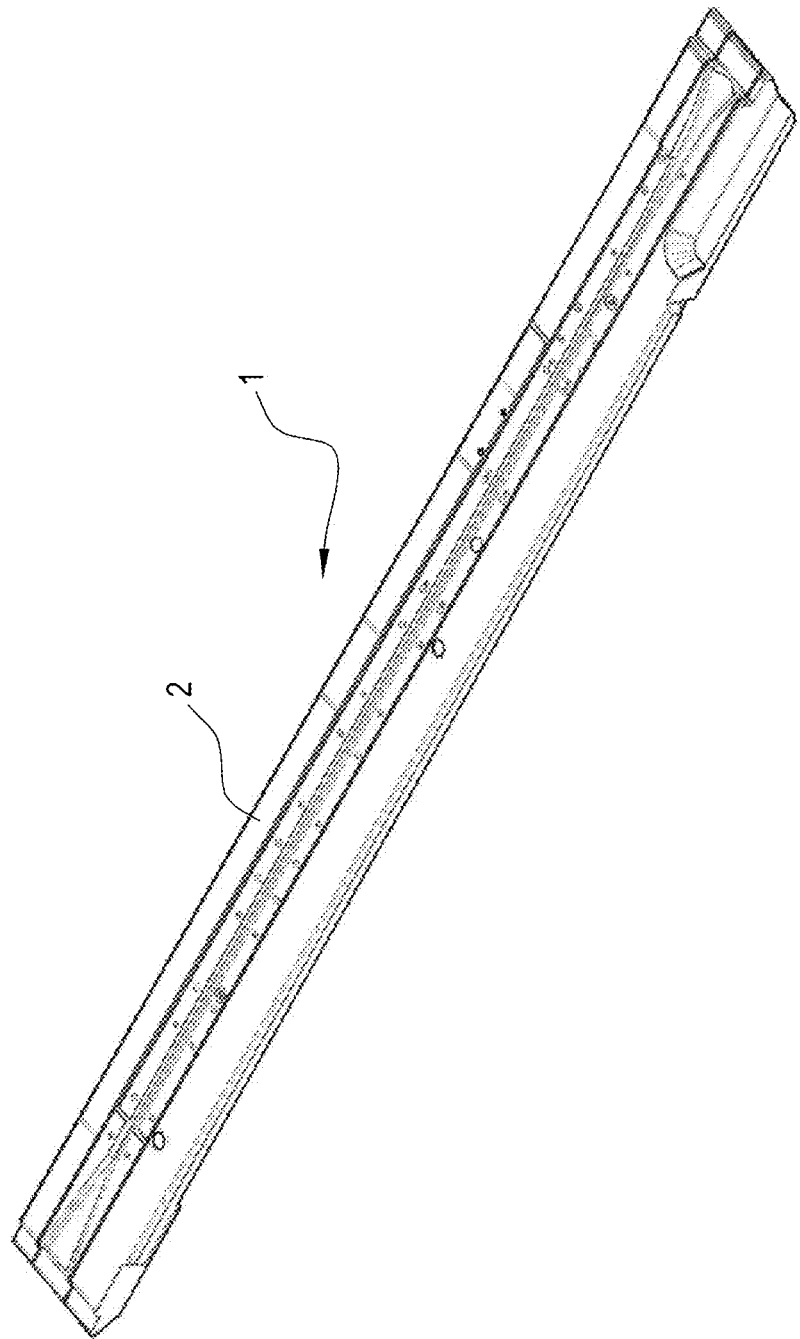
FIGS. 2 and 3 show a guide plate for forming a continuous filter rod according to this invention in views from two different angles (from above and blow, respectively)
Figure 3:
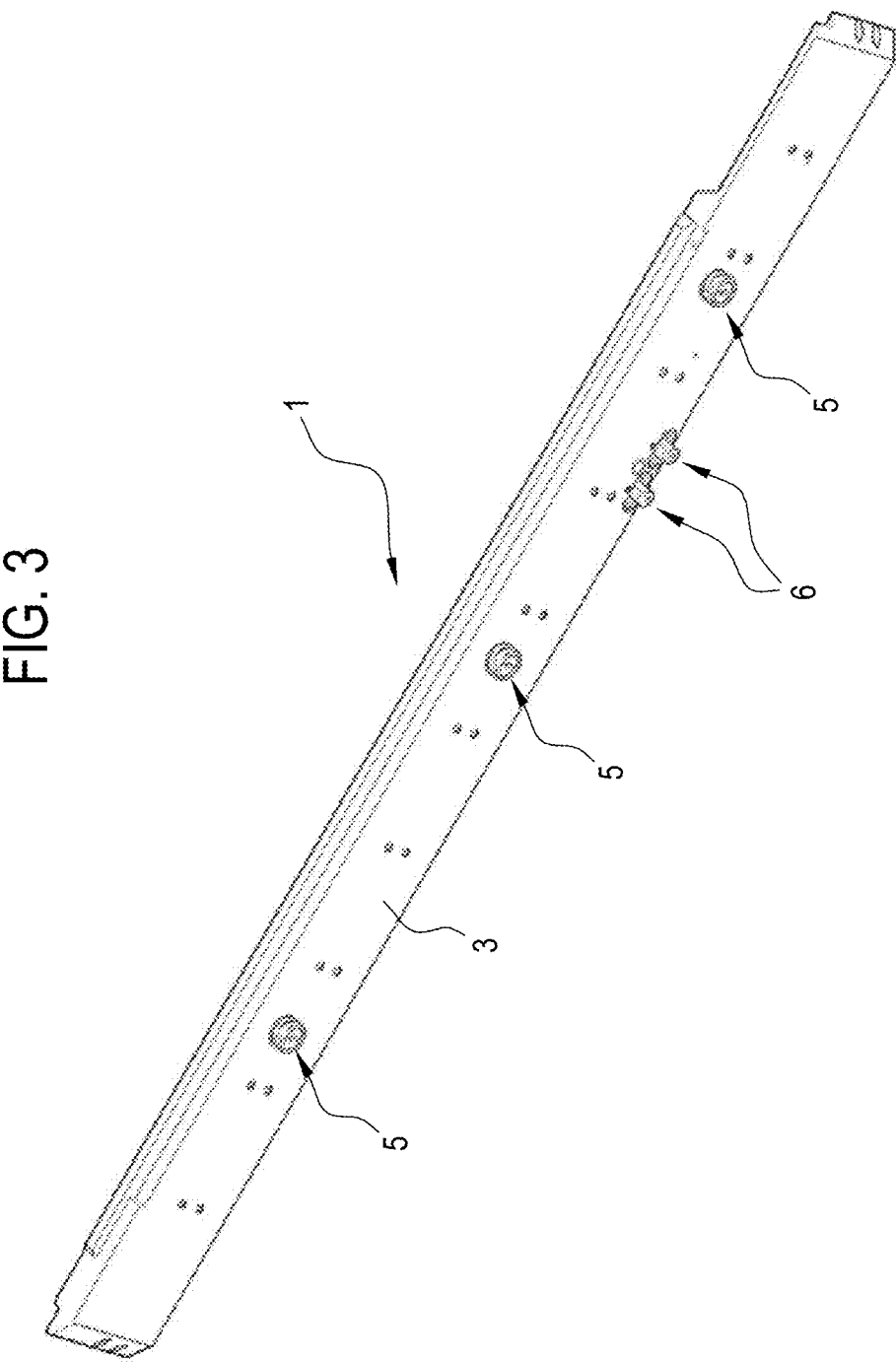
Figure 4:
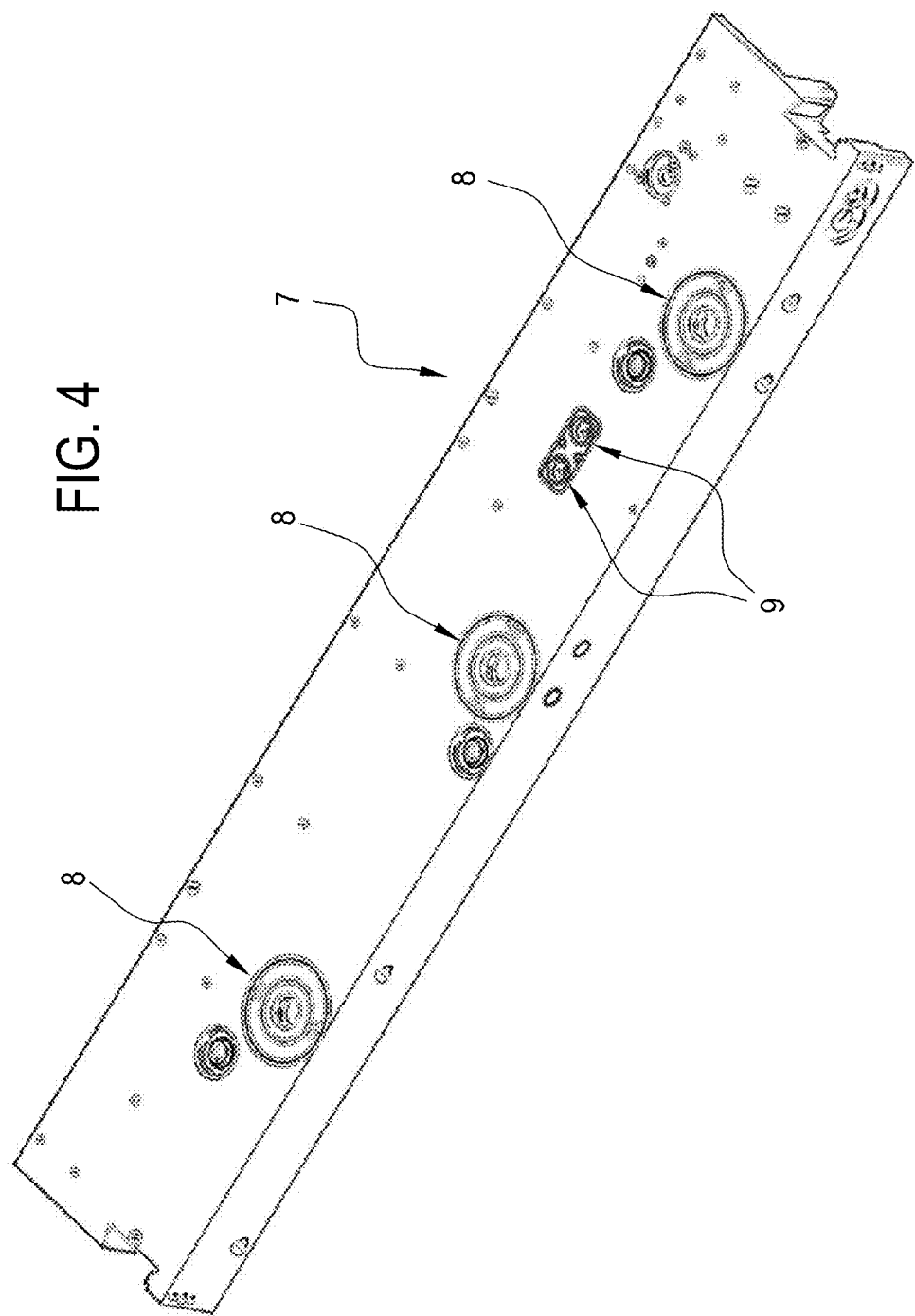
FIG. 4 shows a structural part of a tobacco industry machine according to this invention and adapted to receive in coupling relation the guide plate of FIGS. 2 and 3.

The invention as illustrated in FIGS. 2-4 relates to a forming beam for forming a continuous rod of filter material and whose guide plate is illustrated in FIGS. 2 and 3 and is denoted in its entirety by the numeral 1.

The guide plate 1 has a top surface 2 (FIG. 2) and an underside surface 3 (FIG. 3). The top surface 2, which defines a channel (in the form of a longitudinal groove) 4 for forming and stabilizing the continuous filter rod, is designed to be coupled (in known manner) to a counterplate not illustrated to define a closed channel which is substantially circular in shape.

The underside surface 3, on the other hand, has three plug members 5 which protrude transversely to the flat plane defined by the underside surface itself and which are stably fixed to the body of the plate 1.

Preferably, one or more centring elements 6, whose function is defined further on in this description, extend from the underside surface 3, away from the underside surface 3 itself.

FIG. 4, on the other hand, shows a structural part 7 (that is, a part of the main frame) of a tobacco industry machine, in particular a machine for making filters, configured to receive the guide plate 1 in coupling relation.

More in detail, the structural part 7 has three receiving portions 8 formed on the top surface thereof in such a way as to define respective cavities into which the plug members 5 can be inserted along respective parallel directions of insertion.

The plug members 5 and the receiving portions 8 are part of a device for changing operative parts according to this invention which, in this embodiment, is applied to the current machine portion illustrated in FIGS. 2-4.

Preferably, the structural part 7 also has three centring seats 9 into which the centring elements 6 can be inserted.

In the embodiment illustrated, there are three plug members 5 and three receiving portions 8, aligned with each other. There may, however, be any number of them and arranged in any way, provided only that the distribution of the plug members 5 matches that of the receiving portions 8 into which they are inserted.

Figure 5:
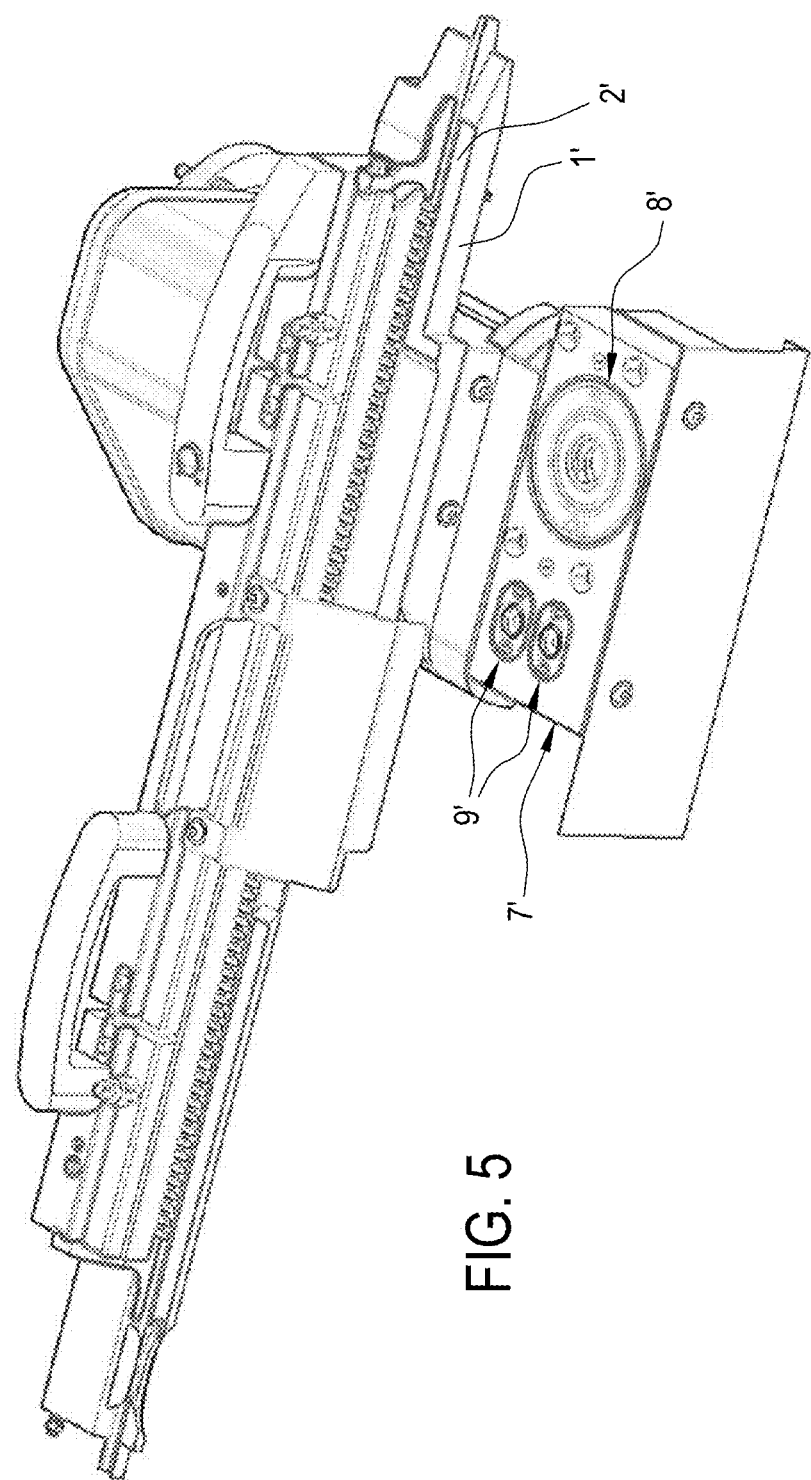
FIGS. 5 and 6 show a feed beam for feeding discrete articles in a tobacco industry machine according to this invention, in views from two different angles.
Figure 6:
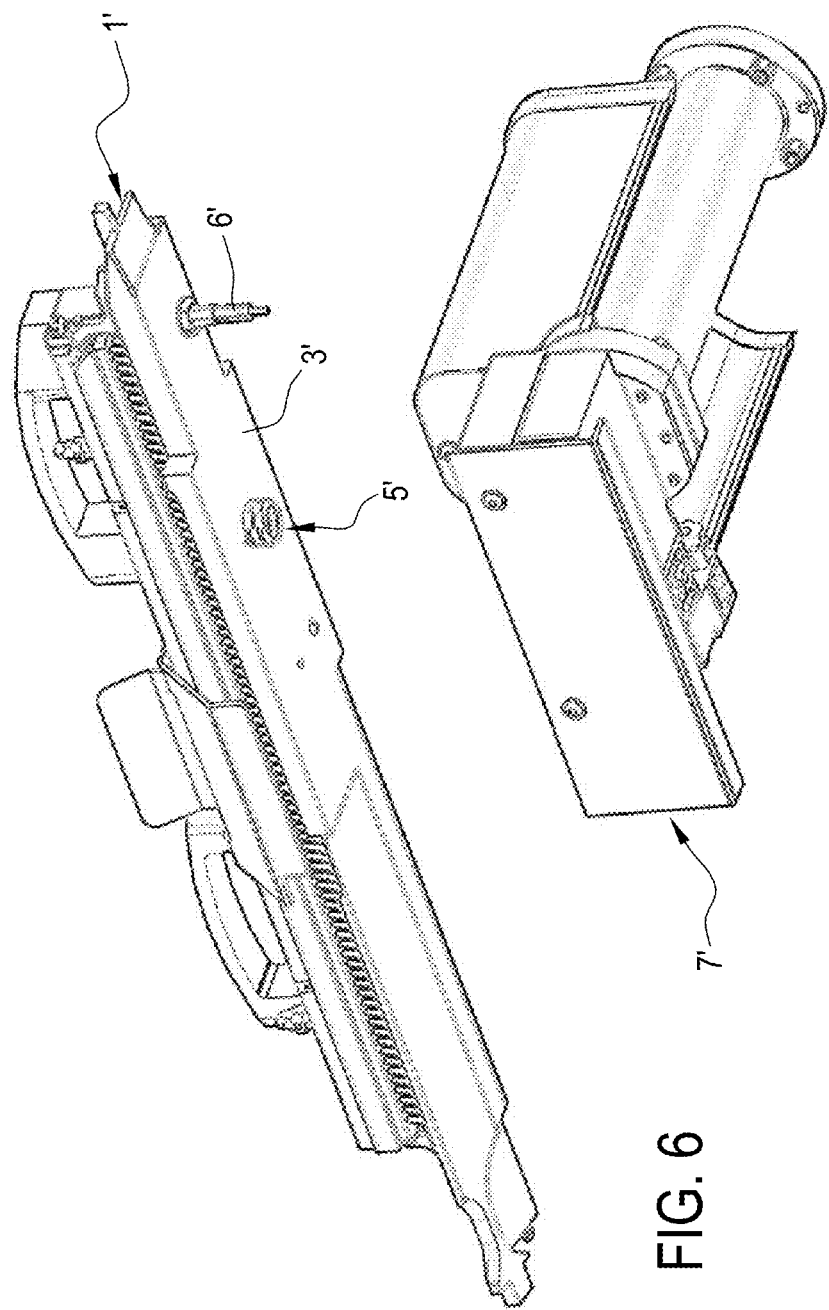

FIGS. 5 and 6 show a different part of a tobacco industry machine, in particular a guide beam for guiding cigarette segments or filter segments (or, more in general, discrete articles) which are made to advance lengthways along it. Clearly visible in this embodiment, too, is the guide plate 1' with the top surface 2' adapted for conveying the articles and the underside surface 3' provided with one plug member 5' and a pair of centring elements 6'. Similarly, the structural part 7' of the machine has a receiving portion 8' designed to receive the plug member 5' and a pair of centring seats 9' to receive the centring elements 6'.

In this case, too, there may be a different number of plug members, centring elements and centring seats, without departing from the scope of the inventive concept.

Figure 7:
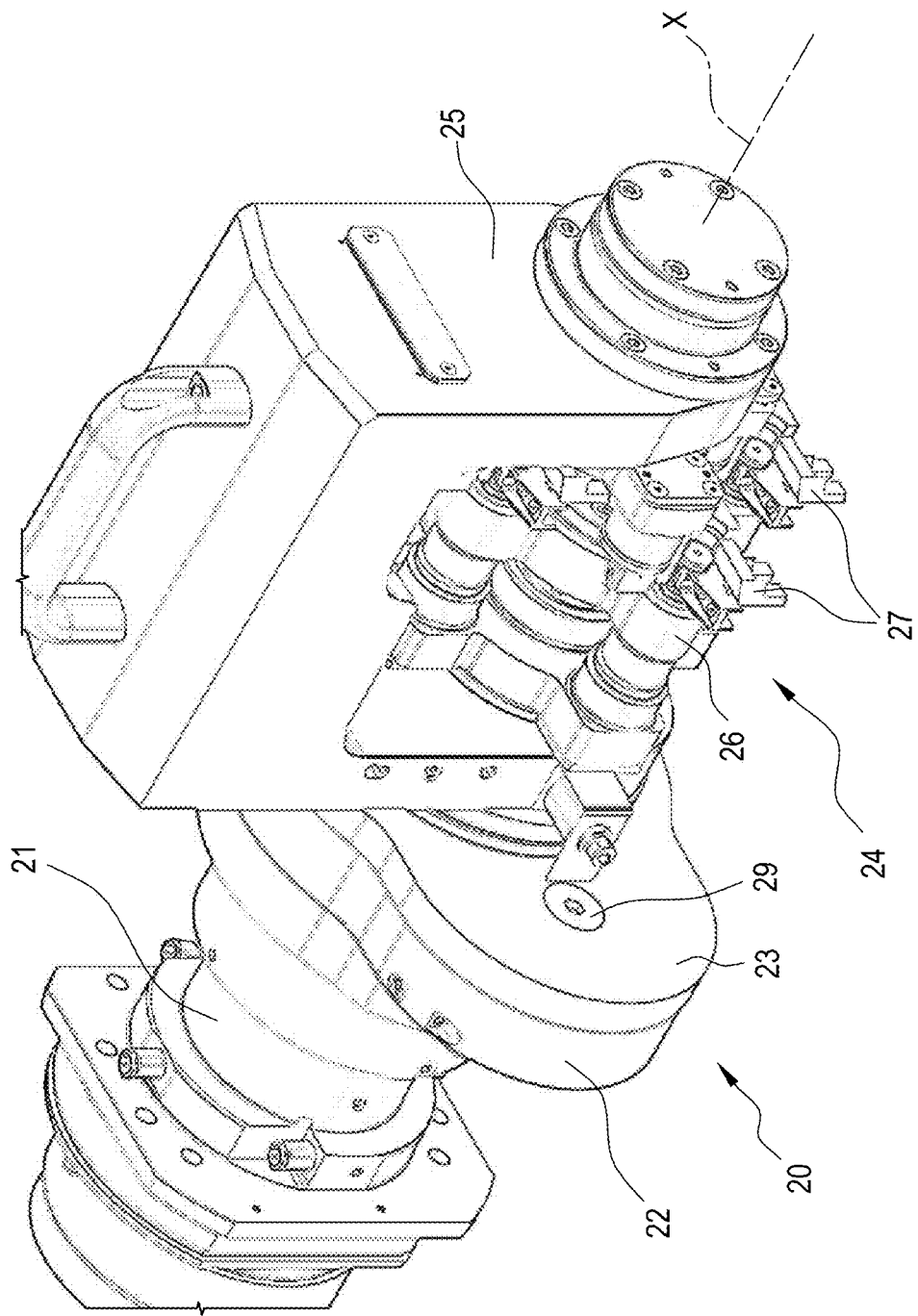
FIG. 7 shows a carousel counterblade device for assisting in the cutting of a continuous rod and forming part of a tobacco industry machine according to this invention.
Figure 8:
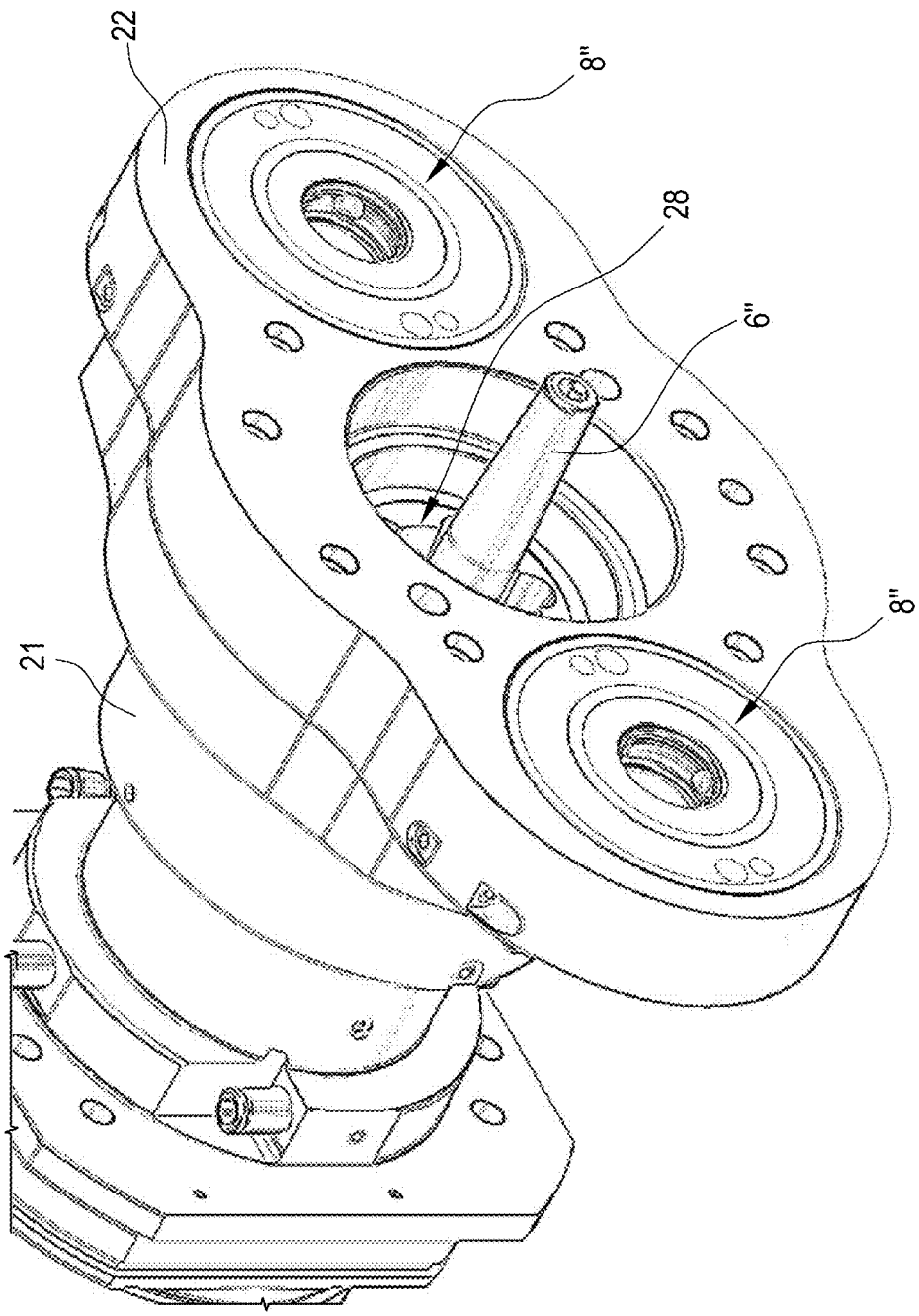
FIGS. 8 and 9 show two different parts of the carousel counterblade device of FIG. 7, separated from each other to better illustrate the features specific to this invention.
Figure 9:
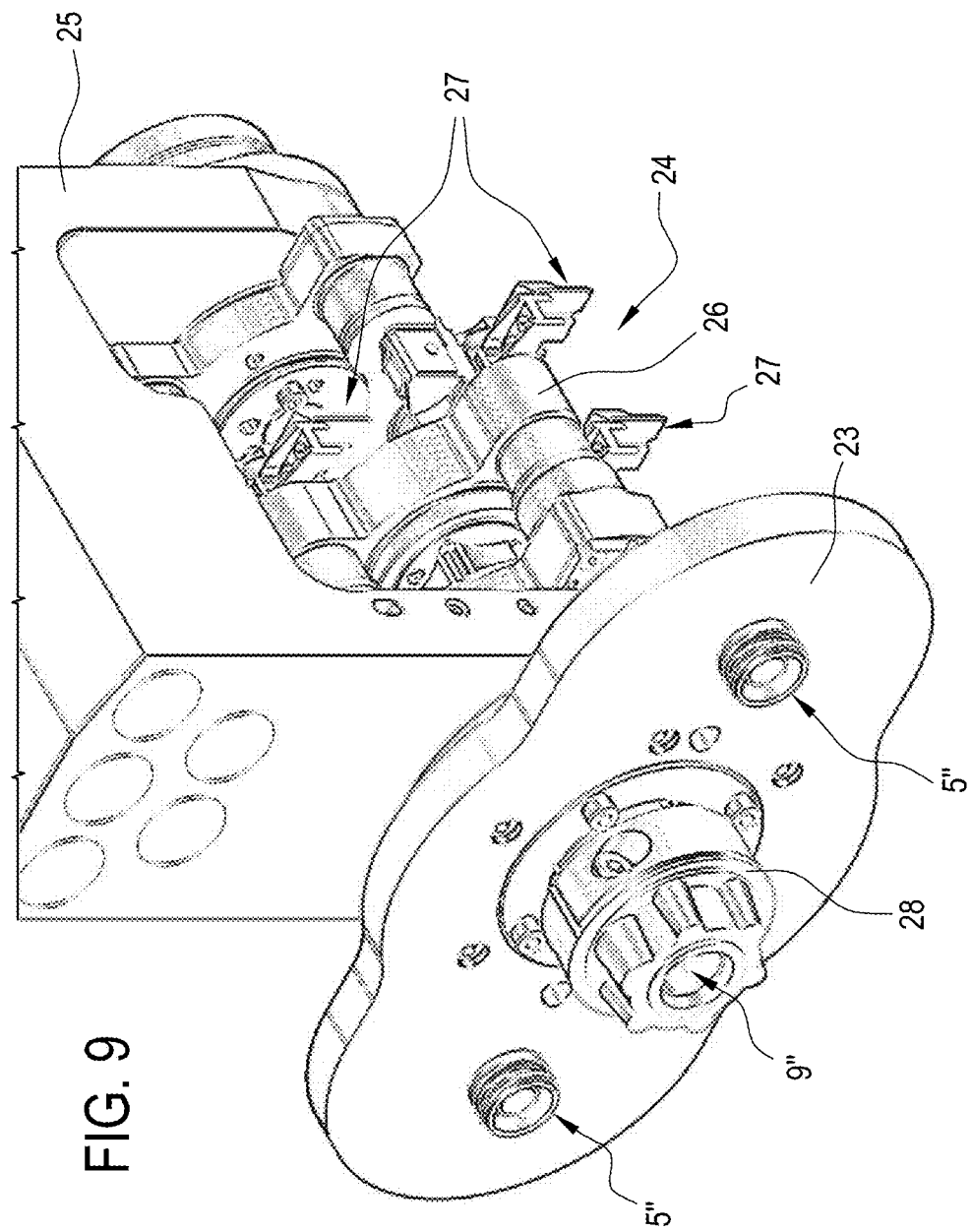

FIGS. 7-9 represent another application of the invention to a tobacco industry machine, in particular to a carousel counterblade device 20.

As shown in FIG. 7, the carousel counterblade device 20 comprises a sleeve 21 integral with the machine structure and to which a first flange 22 is fixed. The first flange 22 is in turn detachably applied to a second flange 23 which supports a carousel 24 of counterblades.

The carousel 24, whose structure is of essentially known type, comprises a portal-frame-like support 25 fixed to the second flange 23 and supporting rotatably about an axis "X" a rotary element 26 equipped with a succession of counterblades 27 angularly distributed around the axis "X". The function of the counterblades 27, as they rotate about the axis "X", is to intercept and support respective portions of a continuous cigarette or filter rod while the rod is subjected to the action of a transverse blade.

Located inside the sleeve 21 and the flanges 22 and 23 there is a drive shaft 28, as shown in FIGS. 8 and 9, also flanged in such a way as to define a front fit when the flanges 22 and 23 are coupled to each other.

According to this invention, one of the two flanges 22, 23 (in particular the flange 22 which is integral with the fixed sleeve 21) is provided with a pair of receiving portions 8" (or a different number of receiving portions 8") whilst the other flange 23 is provided with a corresponding number of plug members 5" which are insertable into respective receiving portions 8" to fixedly couple the two flanges 22, 23 to each other.

As shown in FIG. 7, the plug members 5" are mounted on the second flange 23 by means of fastening elements 29, preferably removable and, still more preferably, of threaded type, and applied on the face of the flange 23 opposite to the plug members 5".

In this embodiment, the centring element 6" is a central protrusion made on the first flange 22 (preferably on the head of the half-shaft), positioned along the axis "X" and insertable into a corresponding central opening formed on the second flange 23 (in particular on the respective half-shaft).

Figure 10:
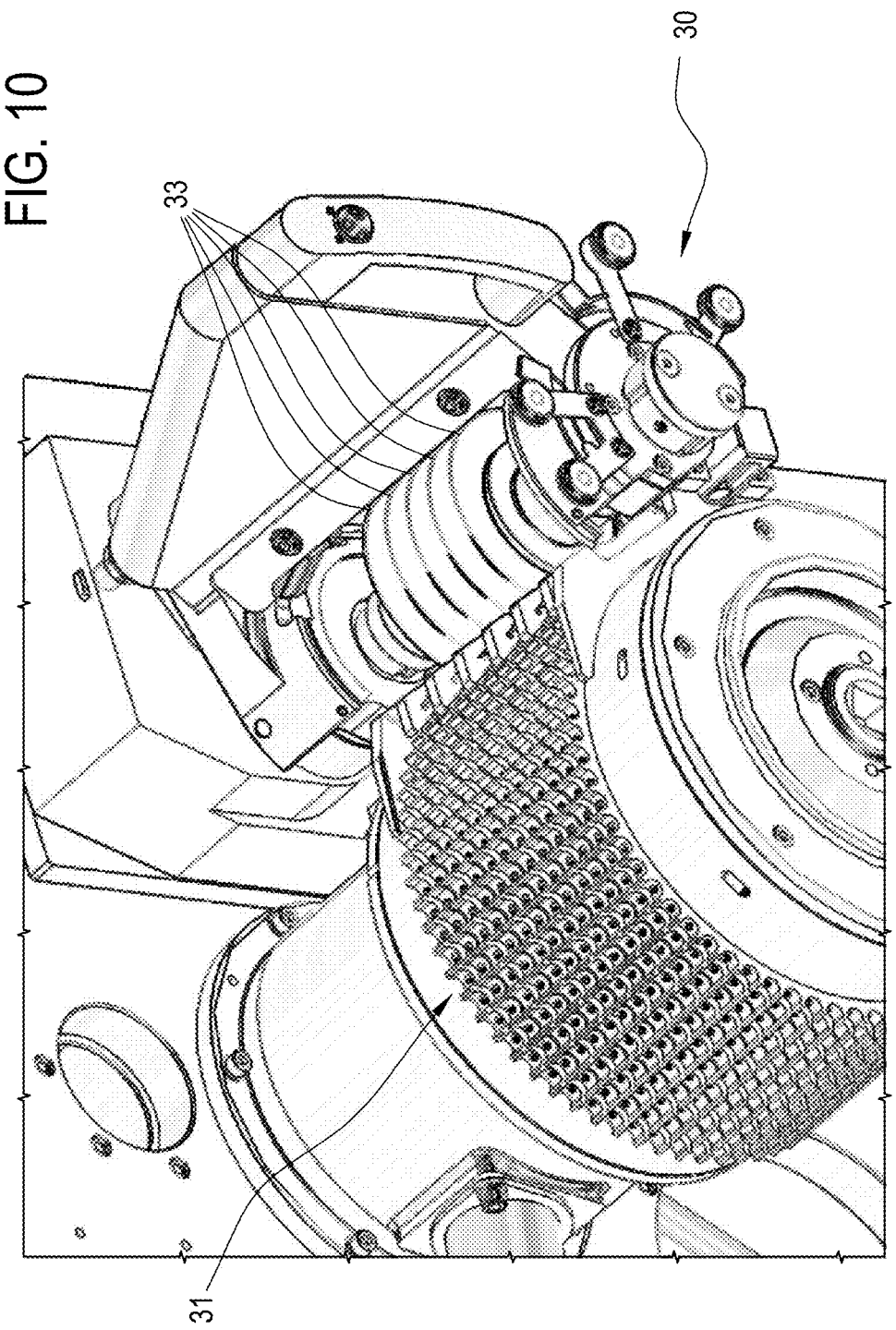
FIGS. 10 and 11 show a cutting unit for cutting filter segments and forming part of a tobacco industry machine according to this invention, in views from two different angles.
Figure 11:
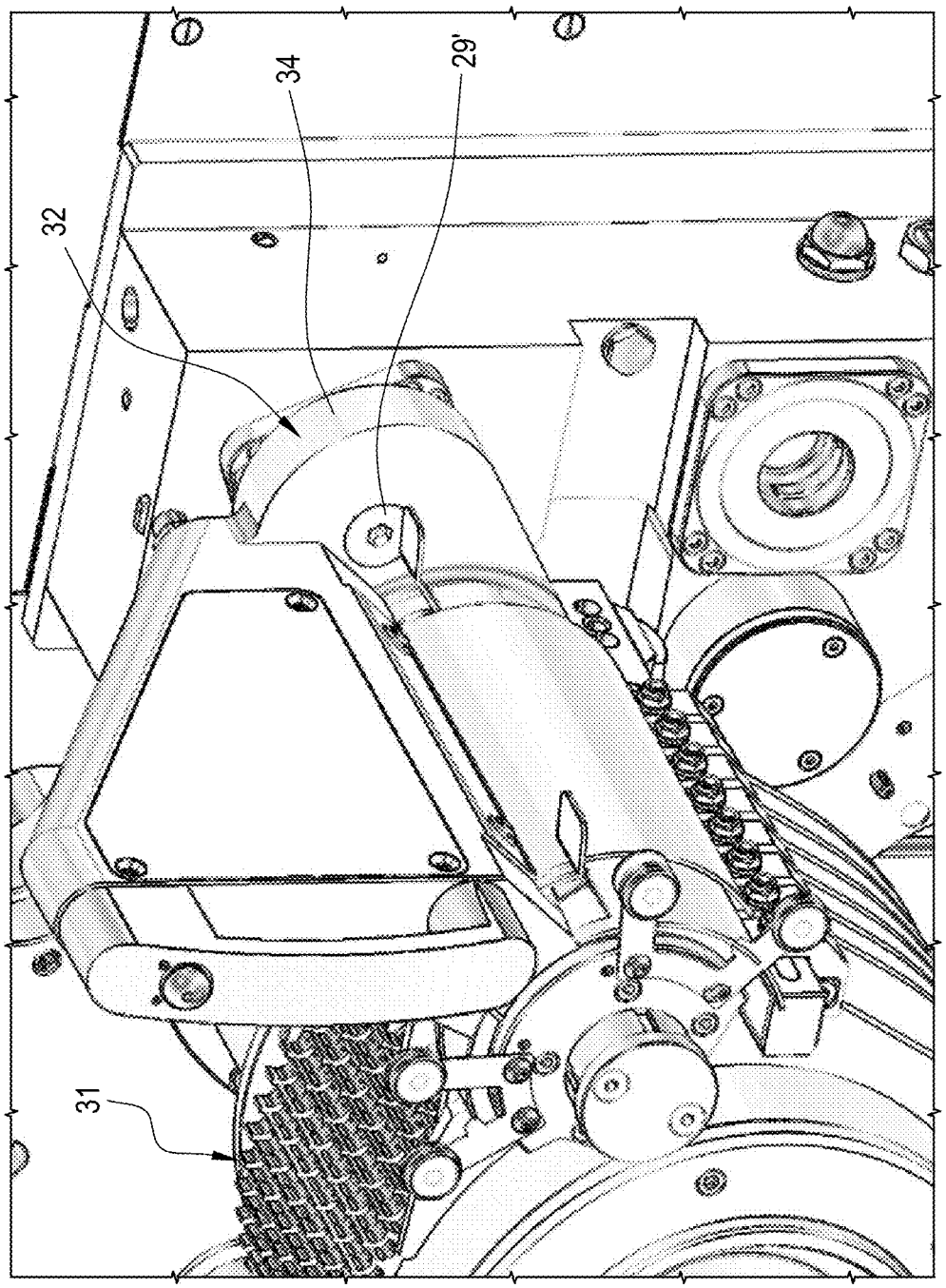

FIGS. 10-11 represent another application of the invention to a tobacco industry machine, in particular to a cutting unit 30 for cutting filter segments.

The cutting unit 30 is of the type used to divide discrete filter segments into parts while the segments are made to advance transversely to their axes on a feed drum 31.

More in detail, the cutting unit 30 comprises a mounting structure 32 which rotatably mounts a plurality of circular blades 33, each inserted into a respective circumferential groove of the drum 31 in known manner.

The mounting structure 32 is provided with a flange 34 equipped with one or more plug members, not shown in FIGS. 10 and 11, detachably applied to the flange by fastening elements 29, one of which is shown in FIG. 11. In the same way as described above with reference to the other embodiments, each plug member fits into a respective receiving seat (not illustrated) made in the machine structure in order to fix the flange 34 (hence the cutting unit 30) to the machine.

What is described above with reference to the embodiments outlined above also applies to other parts of a tobacco industry machine. More generally speaking, the plug members 5, 5', 5" are attached to an operative portion of the machine, where the operative portion is defined as a portion configured to operate directly or indirectly on at least one article or semifinished product of the tobacco industry (a filter or cigarette segment, a continuous filter or cigarette rod, and so on).

The plug members 5 and the receiving portions 8 are coupled to each other as shown in FIGS. 12A-12C.

In these drawings, each receiving cavity 8 is associated with a respective locking member 10, housed in the structural part 7 of the machine and configured to adopt a locked position (FIG. 12B), where it locks the plug member 5 in the receiving portion 8, and a released position (FIG. 12C), where it releases the plug member 5 from the receiving portion 8.

The locking member 10 is movable between the locked and released positions by sliding in a direction perpendicular to the direction of insertion of the plug member 5 into the receiving portion 8.

More in detail, the plug member 5 comprises a lateral seat 11, preferably annular in shape, for engaging a free end 10a of the locking member 10, while the locking member 10 comprises, on its free end 10a, an urging surface 10b configured to transmit to the locking member 10 a sliding movement towards the released position following insertion of the plug member 5 into the receiving seat 8 in such a way as to create a quick snap fit.

Preferably, also, the locking member 10 is held in the locked position by an opposing spring 12.

In this situation, when the plug member 5 is inserted into the receiving portion 8, the plug member 5 acts on the urging surface 10b, thereby pushing the locking member 10 outwards to the released position against the action of the spring 12, by a cam-like movement.

Starting from the locked position (FIG. 12B), the action of the opposing spring 12 must be overcome and the locking member 10 moved away (retracted) from the plug member 5 in order to disengage the free end 10a of the annular seat 11 of the plug member 5 to allow it to be extracted from the receiving socket 8.

For this purpose, suitable actuating means 13 forming part of the changing device according to the invention are provided to act on the locking member 10 to cause it to move at least away from the plug member 5 (and possibly also to cause it to move in the opposite direction).

Preferably, the actuating means 13 comprise a pressurized fluid circuit, either hydraulic or pneumatic, which can be controlled manually by a user (for example using a command or a pushbutton) and which operates on the locking member 5 at least to move the locking member 5 from the locked position to the released position.

In the embodiment illustrated, the linear movement of the locking member 10 away from the plug member 5 is obtained by providing the actuating means 13 with a plate 14 which is subjected to the pressure of the fluid of the fluid circuit and slidable into a chamber 15 along a direction substantially perpendicular to the sliding direction of the locking member 10 (and, in particular, parallel to the direction of insertion of the plug member 5 into the receiving seat 8). At the same time, the plate 14 is integral with an operating finger 16 which is slightly inclined relative to the advancing direction of the plate and engaged with the locking member 10 by a cam-like coupling in such a way that the advancing movement of the plate 14 produces a retracting movement (however slight) of the locking member 10, bringing it to the released position.

It is, however, possible to implement other solutions, different from the one illustrated, described above, to move the locking member 10 translationally by hydraulic or pneumatic pressure from the locked position to the released position.

In the solution described above, it is evident that the plug member 5 and the locking member 10 are configured in such a way as to create a mutual interaction defining a quick connection and/or disconnection.

The invention described above achieves the preset aims, overcoming the disadvantages of the prior art.

The quick connect/disconnect system described above saves considerable amounts of time during machine changeovers, or more generally speaking, when changing an operative part of the machine, because the change can be effected by simply activating a command or pressing a release button to remove the part concerned and change it with a replacement part, for example a new part or one suitable for the product to be processed, which can then quickly be attached to the machine frame, with considerable advantages in terms of reduced machine downtimes.

This invention thus allows quick replacement or changing of all those devices which must be rapidly removed for product changeovers, changing of wear parts or parts which must be removed and changed for maintenance purposes.

The invention claimed is:

1. A device for changing operative portions for a tobacco industry machine, comprising:
   a plurality of receiving portions made in a structural portion of a tobacco industry machine;
   a plurality of plug members attached to an operative portion of the tobacco industry machine and insertable into corresponding ones of the receiving portions, the operative portion being configured to operate directly or indirectly on at least one article or semifinished product of the tobacco industry;
   locking members, housed in the structural portion and configured to adopt locked positions, where the locking members lock corresponding plug members in the corresponding receiving portions, and released positions, where the locking members release the corresponding plug members from the corresponding receiving portions;
   an actuator configured to act on the locking members at least to move the locking members from the locked positions to the released positions;
   wherein the actuator operates simultaneously on the locking members to cause the locking members to move simultaneously into the released positions.

2. The device according to claim 1, wherein the plug members and the locking members are configured to create a mutual interaction defining a quick connection and/or disconnection.

3. The device according to claim 1, and further comprising opposing springs holding the locking members in the locked positions.

4. The device according to claim 1, wherein the locking members are movable between the locked and released positions by sliding in a direction perpendicular to a direction of insertion of the plug members into the receiving portions.

5. The device according to claim 1, wherein each of the plug members comprises a lateral seat, annular in shape, for engaging a free end of a corresponding one of the locking members, and wherein each of the clocking members comprises, on a free end of the locking member, an urging surface configured to transmit to the locking member a sliding movement towards the corresponding released position following insertion of the plug member into the receiving seat in such a way as to create a quick snap fit.

6. The device according to claim 1, wherein the actuator comprises a pressurized fluid circuit, either hydraulic or pneumatic, operating on the locking members at least to move the locking members from the locked to the released positions and wherein the fluid circuit is configured to be controlled manually by a user.

7. The device according to claim 6, and further comprising a control for activating the pressurized fluid circuit.

8. The device according to claim 1, further comprising a male centering element applied to one of either the portion or the structural portion, and a corresponding female centering element applied to the other of either the operative portion or the structural portion, the male centering element and the female centering element being shaped to match each other and being configured to be slotted together to define a predetermined mutual position between the structural portion and the operative portion.

9. A tobacco industry machine, comprising the device according to claim 1.

10. The machine according to claim 9, wherein the device is positioned to attach a rod forming beam by which a continuous cigarette rod is formed.

11. The machine according to claim 9, wherein the device is positioned to attach a rod forming beam by which a continuous filter rod is formed.

12. The machine according to claim 9, wherein the device is positioned to attach a carousel counterblade device.

13. The machine according to claim 9, wherein the device is positioned to attach a cutting unit for cutting pieces of cigarette or filter.

14. The machine according to claim 9, wherein the device is positioned to attach a feed beam for feeding a succession of discrete articles advancing lengthways of axes of the discrete articles.

* * * * *